United States Patent
Tanriover (10) Patent No.: US 10,852,728 B2
(45) Date of Patent: Dec. 1, 2020

(54) REMOTE DRIVER STATE CONSIDERATION FOR AUTONOMOUS VEHICLES

(71) Applicant: Intel Corporation, Santa Clara, CA (US)

(72) Inventor: Cagri Cagatay Tanriover, Bethany, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 15/855,966

(22) Filed: Dec. 27, 2017

(65) Prior Publication Data
US 2019/0049965 A1 Feb. 14, 2019

(51) Int. Cl.
G05D 1/00 (2006.01)
G08G 1/01 (2006.01)
B60W 30/00 (2006.01)
G08G 1/16 (2006.01)

(52) U.S. Cl.
CPC .......... G05D 1/0088 (2013.01); B60W 30/00 (2013.01); G08G 1/01 (2013.01); G08G 1/163 (2013.01)

(58) Field of Classification Search
CPC ....... G05D 1/0088; B60W 30/00; G08G 1/01; G08G 1/163
USPC .................................................. 701/27, 301
See application file for complete search history.

(56) References Cited

U.S. PATENT DOCUMENTS

| | | | | |
|---|---|---|---|---|
| 6,765,495 B1 * | 7/2004 | Dunning | ............... | G08G 1/161 340/435 |
| 7,986,247 B2 * | 7/2011 | Bauer | .................... | G08G 1/162 340/435 |
| 10,586,405 B2 * | 3/2020 | Denny | ................... | G07C 5/008 |
| 2011/0080302 A1 * | 4/2011 | Muthaiah | .......... | H04W 12/0609 340/903 |
| 2012/0310518 A1 * | 12/2012 | Chen | ...................... | G08G 1/162 701/301 |
| 2013/0073115 A1 * | 3/2013 | Levin | ..................... | G08B 21/06 701/1 |
| 2016/0250968 A1 * | 9/2016 | Shirakata | .............. | B60W 50/16 340/576 |
| 2018/0144636 A1 * | 5/2018 | Becker | .................. | B60W 30/09 |

OTHER PUBLICATIONS

"Dutch City Region of Eindhoven Works with IBM and NXP to Improve Traffic Row and Road Safety", http://www-03.ibm.com/press/us/en/pressrelease/40212.wss, (Feb. 21, 2013), 3 pgs.
"Fact Sheet: Improving Safety and Mobility Through Connected Vehicle Technology", U.S. Department of Transportation, (accessed on Feb. 13, 2019), 4 pgs.

(Continued)

Primary Examiner — Tan Q Nguyen
(74) Attorney, Agent, or Firm — Schwegman Lundberg & Woessner, P.A.

(57) ABSTRACT

Methods and apparatus are described for considering a remote driver state. Embodiments decode, from a message received from a remote vehicle, a remote driver state of a driver of the remote vehicle and a level of the remote driver state. A change in a driving characteristic of a vehicle is determined based on the remote driver state and the level of the remote driver state. The change in the driving characteristic is then made.

25 Claims, 6 Drawing Sheets

(56) References Cited

OTHER PUBLICATIONS

"Honda Introduces "Cooperative Mobility Ecosystem" at CES 2017", https://global.honda/newsroom/news/2017/c170106eng.html Accessed on Mar. 5, 2019, (Jan. 6, 2017), 4 pgs.

"Hyundai Motor Company Introduces a Health + Mobility Concept for Wellness in Mobility", https://www.hyundaiusa.com/about-hyundai/news/Corporate_HYUNDAI_MOTOR_COMPANY_INTRODUCES_A_HEALTH_MOBILITY_CONCEPT_FOR_WELLNESS_IN_MOBILITY-20170104.aspx accessed on, (Jan. 4, 2017), 4 pgs.

"Mitsubishi Develops Distracted Driving Detection Tech", https://www.automotive-fleet.com/132187/mitsubishi-develops-distracted-driving-detection-tech Accessed on Feb. 13, 2019, (Oct. 30, 2015), 2 pgs.

Stewart, Jack, "Toyota's Concept-I Envisions an Autonomous Future That'S Actually Fun", Wired, (Jan. 4, 2017), 4 pgs.

* cited by examiner

REMOTE DRIVER STATE CONSIDERATION FOR AUTONOMOUS VEHICLES

TECHNICAL FIELD

Embodiments described herein relate generally to vehicle-to-vehicle communications. A vehicle may convey a state of the driver of the vehicle to another vehicle. The other vehicle may then change its operation based on the state of the driver.

BACKGROUND

Autonomous or semi-autonomous vehicles are table to detect when a driver is experiencing absent-mindedness, stress, or other cognitive distractions that might have negative impacts on driving. When an impaired driver is detected, the vehicle may provide a warning to the driver or suggest that the vehicle control the driving. The driver, however, may not relinquish driving responsibilities and continue to operate the vehicle. While there are systems that allow vehicles to share driving states, such as speed, acceleration, location, etc., with other vehicles or infrastructure, the driver state may also prove useful to other vehicles.

DETAILED DESCRIPTION

Driver state recognition may be used for reducing danger for a distracted driver and may also be an important feature used for reducing the risk of collision with other vehicles. A semi-autonomous vehicle with a distracted driver may be able to reduce the collision risk by warning not only the distracted driver but also remote vehicles that are near the semi-autonomous vehicle with the distracted driver. Although the neighboring vehicles may be equipped with advanced sensing technologies including radar, LIDAR, cameras, etc., these technologies are incapable of detecting a potential risk unless indications of that risk are visually detectable externally in advance. For example, if a car swerves in front of an autonomous vehicle, changes lane, slows down or speeds up, etc., all of these actions may be detected by the onboard sensors in the autonomous vehicle. However, if there is a distracted driver behind the wheel of the car there may be no detectable clues regarding the driver's state. Accordingly, autonomous vehicles near the distracted driver will not be able to take into account the potential risks and will be unable to take any preventative actions in time, which may potentially lead to a crash.

The present disclosure includes mechanisms to provide an advance warning to neighboring autonomous vehicles regarding the state of drivers in nearby vehicles. The driver states may then be used to take timely and preventative action based in semi-autonomous vehicles or vehicles with advanced driver assistance systems.

In an example, modules, hardware components, etc., provide an interface to an existing vehicle communication system, such as a dedicated short-range communication (DSRC) system. In a DSRC example, the TCP/UDP level may be used to share driver state information with the neighboring automated vehicles (AVs). The modules may include a driver state recognition module, a driver state exchange module, and an action/decision module. The incorporation of these modules allow neighboring AVs around a vehicle (ego vehicle) with an unfit driver to become aware of that driver's state in a timely manner and to take actions based on the driver's state. For example, neighboring AVs may make a driving change to increase distance between itself and the ego vehicle to avoid an accident. One benefit of the system disclosed herein is that AVs are able to become aware of potential accident risks in advance to take timely precautions in situations where technologies such as radar, LIDAR and cameras cannot help. Another benefit of this system is, because DSRC uses pseudonyms to identify each car (as provisioned and maintained by the Security Certificate Management System (SCMS)), the broadcasted driver state information, therefore, cannot be traced back to individuals and therefore the privacy of each driver is protected.

Currently known systems are either not designed to detect safety risks such as drowsy driving, drunk or drugged driving, confusion, frustration, or distracted driving or the current systems are unable to share that information with nearby autonomous vehicles to make them aware of potential risks and allow them to take the necessary precautions promptly to collectively improve road safety. This lack of synergy between the two types of systems leaves some of the critical driver state related road safety issues unaddressed, which is a disadvantage of the existing systems today.

Figure 1:
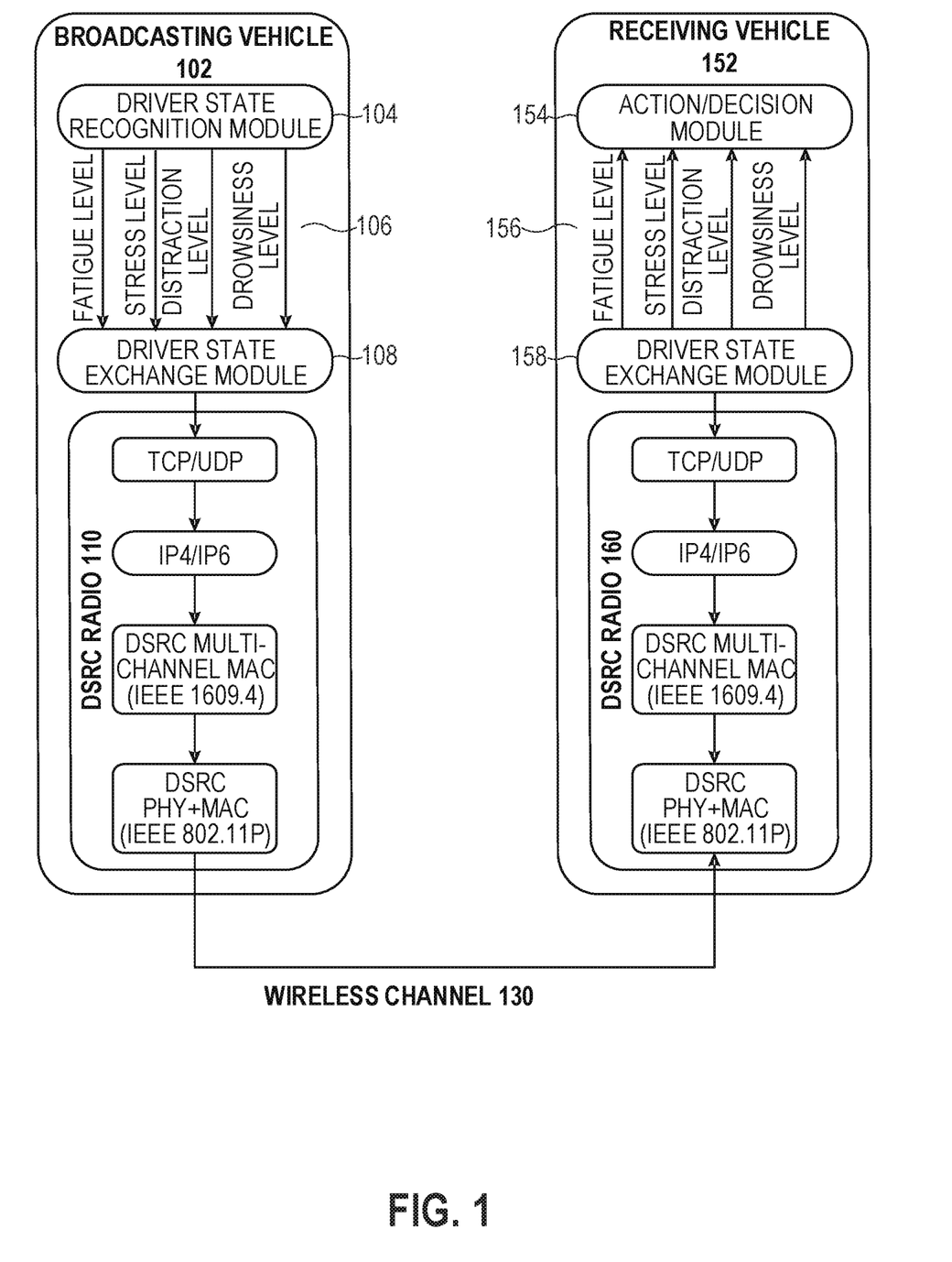
FIG. 1 illustrates a system for communicating driver state information according to an embodiment.

FIG. 1 illustrates a system for communicating driver state information according to an embodiment. FIG. 1 shows a broadcasting vehicle 102 and a receiving vehicle 152. Each vehicle includes a radio 110 and 160 which may be a DSRC radio. This radio is already a feature in some vehicles that support vehicle-to-vehicle (V2V) communication. The vehicles 102 and 152 may be semi-autonomous, fully autonomous or vehicles with advanced driver assistance systems. A driver state recognition (DSR) component 104 has access to the sensors inside the car 102 (such as driver facing camera, seat pressure sensors, steering wheel pressure sensors, rotation sensors, etc.), which provide data used by the DSR 104 to recognize driver states 106 such as fatigue, drowsiness, stress and distraction. For example, the DSR 104 may use machine learning or classifier systems to determine the driver state from the sensor data.

The DSR 104 may be connected to a sensor fusion and feature extraction block (not shown) internally. The fusion and feature extraction blocks may be used to extract useful features from the sensor data. The useful features may be related to the driver state. The various features may then be passed into a classifier and a recognition module (not shown) that is part of the DSR 104. The DSR 104 may then determine which state the driver is in and a measure of how immersed the driver is in that state (e.g., fatigue level, stress level, etc.). In addition, the DSR 104 may determine the driver is in an alert state, such that the driver is paying attention to the road.

Detected driver state levels may then be fed to a driver state exchange (DSX) component 108. The DSX 108 may encoded the driver state and level as a DSRC message. As part of the existing DSRC standard, messages that are outside the SAE standard definitions may be incorporated as part of an independent application and still are able to use the DSRC communication framework. The AVs on the road will, therefore, be able to recognize and act upon the DSRC message. In an example to be compatible with the DSRC standard, the entity developing an application registers a Provider Service ID (PSID) with IEEE in order to uniquely identify that application. The DSX component 108 may both transmit and receive driver state information over a wireless channel 130. Therefore, the radio 110 and 160 may be present in the broadcasting vehicle 102 as well as the receiving vehicle 152. Upon receiving the driver state information, a DSX module 158 at the receiving vehicle 152 decodes the message to obtain the driver states and their levels 156. As an example, information that may be received is presented in Table 1. Each message may include one or more of the various target states. For example, a message may only include a state whose value range is above a particular threshold. As another example, the message may include only the target state with the highest value range. The alertness level may be calculated as a combination of other levels. For example, the alertness level may be calculated based on the drowsiness, stress, distraction, and/or fatigue levels.

TABLE 1

| Target State | Value Range |
| --- | --- |
| Drowsiness Level | 0-100 |
| Stress Level | 0-100 |
| Distraction Level | 0-100 |
| Fatigue Level | 0-100 |
| Alertness Level | 0-100 |

The received driver states 156 are passed to an action-decision (ADE) component 154 that determines which actions the receiving vehicle 152 should take based on the state of the driver in the broadcast vehicle 102. The road conditions, weather conditions, and the state of the receiving vehicle (not shown as inputs to 154 in FIG. 1) 152 may also be taken into account by the ADE 154. The receiving vehicle 152 may either take action based on the dominant driver state or a combination of the driver states. The ADE 154 may be thought of as a standalone fusion block where all the required parameters are jointly considered in order to decide on the best course of action to take. For example, if the driver state 156 indicates a distracted driver, a course of action may be made to avoid a potential accident with the broadcasting vehicle 102. For example, the distance between the receiving vehicle 152 and the broadcasting vehicle 102 may be increased by decreasing speed, increasing speed, changing lanes, etc. Alternatively, the ADE 154 may be part of another sub-system in an AV already available to make such decisions and take actions.

As the receiving vehicle 152 may also include a DSX system 158, the receiving vehicle 152 may detect its driver state 156 and broadcast its driver state 156 using its radio 160.

Figure 2A:
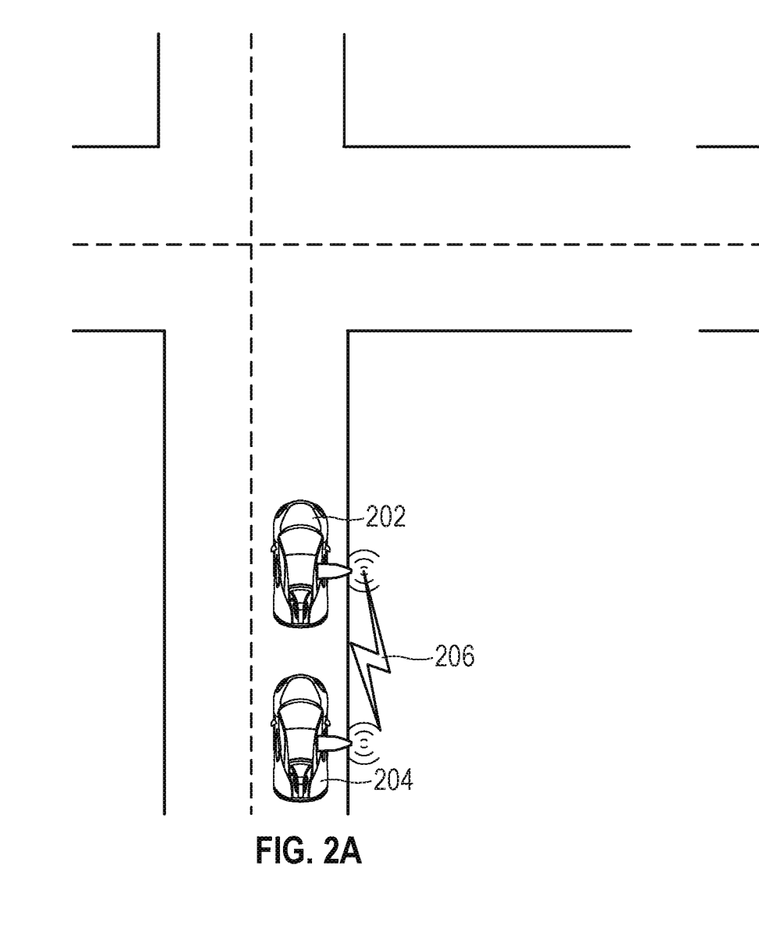
FIGS. 2A-2B illustrate an example of a vehicle adapting its driving based on received driver state information according to an embodiment.
Figure 2B:
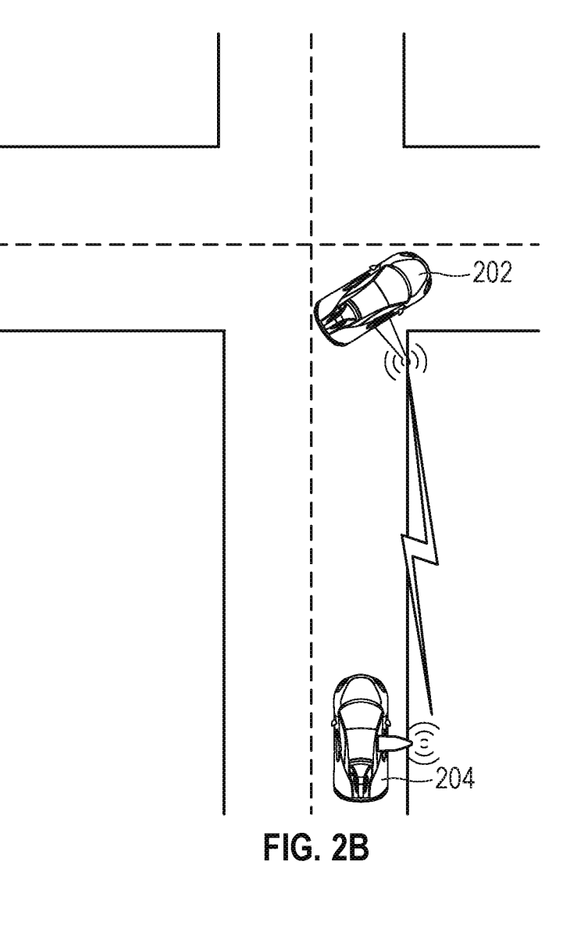

FIGS. 2A-2B illustrate an example of an AV 204 adapting its driving based on received driver state information of an AV 202 according to an embodiment. In the example in FIG. 2A, the AV 202 is followed closely by the AV 204. The driver recognition system in the AV 202 measures the stress level of its driver as high and proposes, to the driver, taking control of the AV 202. The driver refuses to hand over control and continues to drive while their stress level continues to increase. In the meantime, the AV 202 broadcasts 206 the stress level of the driver, which is received by the AV 204. Because the radar, LIDAR, and the cameras on the AV 204 have not visually detected any potentially risks related to the AV 202 so far, the AV 204 has been moving behind the AV 202 at constant speed. Upon receiving a message that includes the driver's stress level, the AV 204 increases the distance between itself and the AV 202 by slowing down. The AV 204 maintains a low and constant speed until the AV 202 takes a right turn after which the AV 204 brings its speed back to normal as it continues straight across the intersection as shown in FIG. 2B.

Figure 3A:
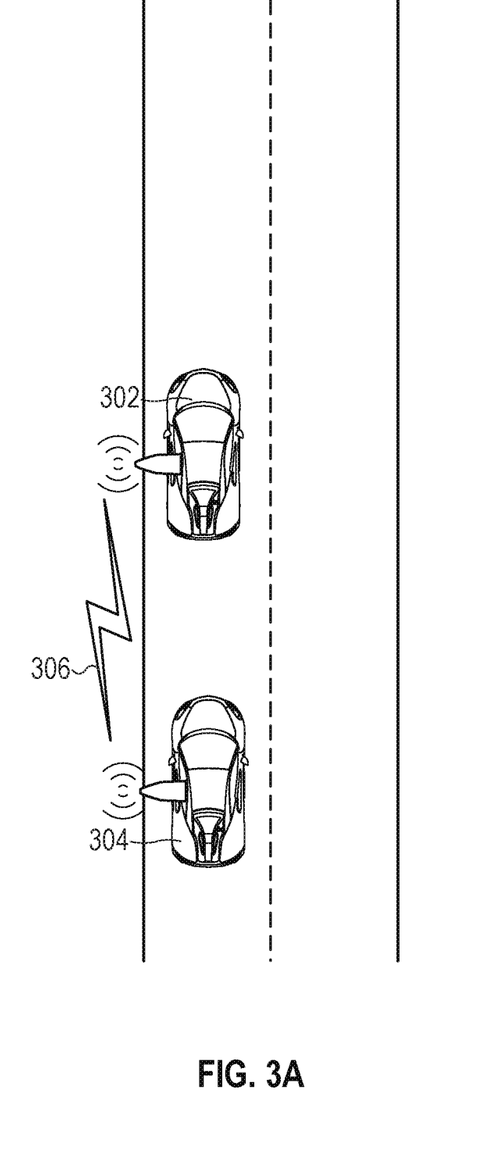
FIGS. 3A-3B illustrate an example of a vehicle adapting its driving by moving into a different lane based on received driver state information according to an embodiment.
Figure 3B:
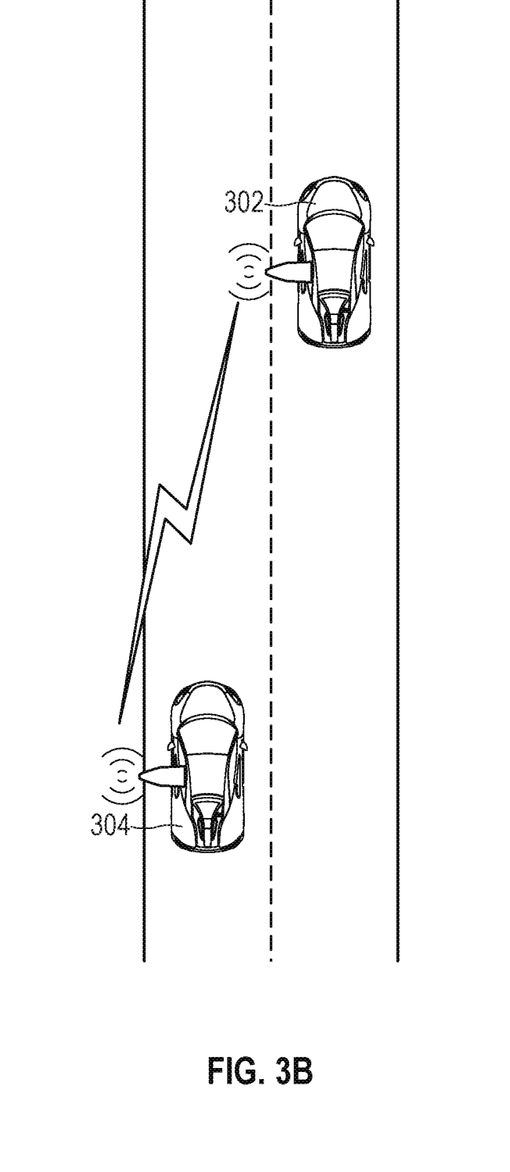

FIGS. 3A-3B illustrate an example of an AV 302 adapting its driving by moving into a different lane based on received driver state of another AV 304 information according to an embodiment. In FIG. 3A, the AV 302 is being followed by another AV 304. The driver of the AV 304 is texting on their mobile phone while occasionally paying attention to the road ahead. This high distraction level is detected by the driver facing camera of the driver assistance system inside AV 304, which repetitively issues audio notifications urging the driver to pay attention to the road. The driver of the AV 304 ignores those warnings and keeps texting while driving. In the meantime, the AV 304 starts to broadcast 306 the high distraction level over the DSRC channels. Until now the AV 302 has been moving in the same lane at constant speed because the radar, LIDAR and the cameras have not reported any potential risks related to the AV 304 behind it. Upon receiving the broadcasted message, the AV 302 detects the potential danger and moves to the right lane while slightly increasing its speed to create a safer distance between itself and the AV 304 as shown in FIG. 3B. Once a safe distance has been achieved, the AV 302 may return to its previous speed. The AV 302 may monitor the distance between itself and the AV 304. If the distance decreases to less than the determined safe distance, the AV 302 may make appropriate state changes such that the safe distance is maintained.

Figure 4A:
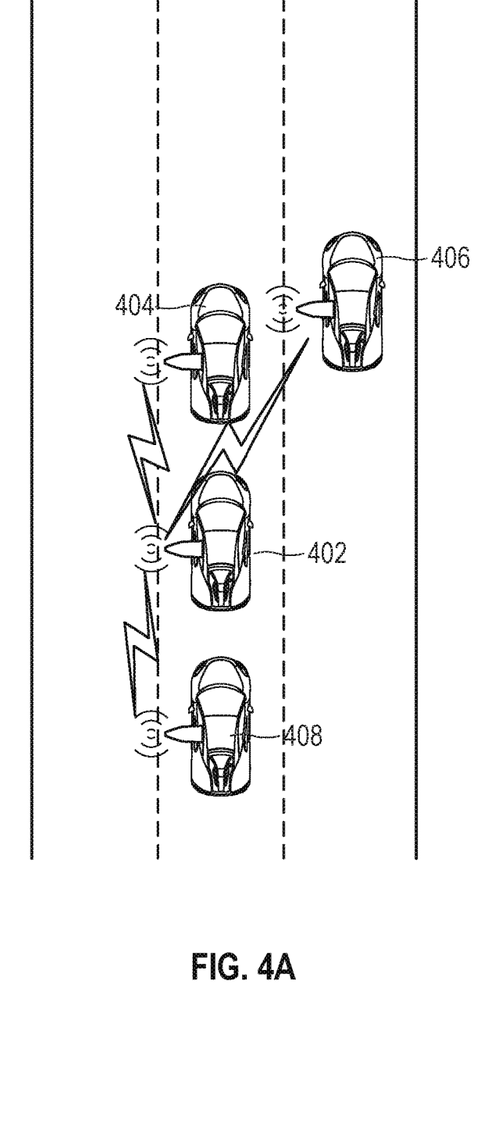
FIGS. 4A-4B illustrate an example of vehicles adapting their driving by moving into a different lane or changing speeds based on received driver state information according to an embodiment.
Figure 4B:
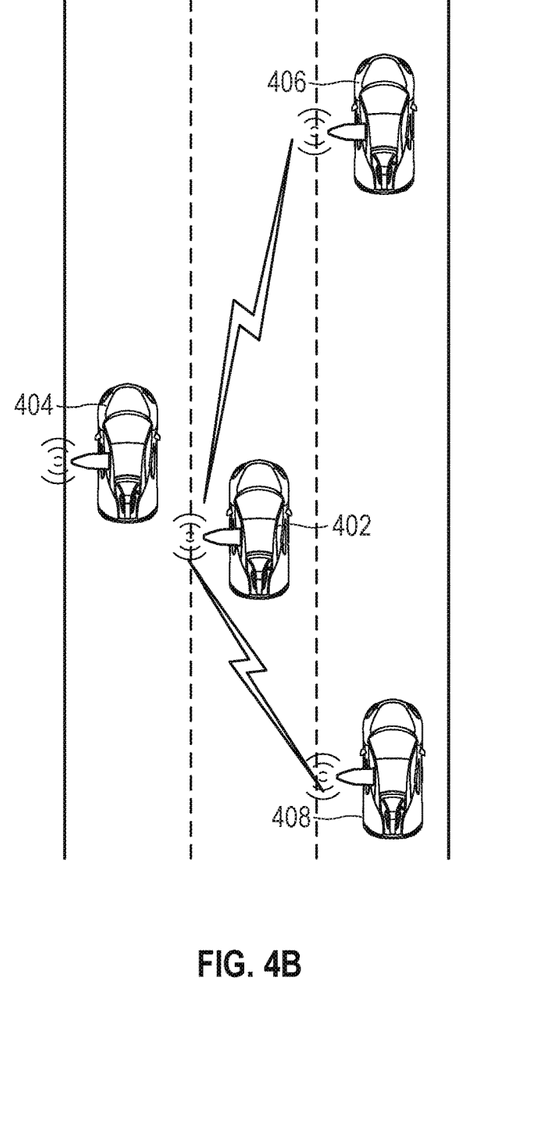

FIGS. 4A-4B illustrate an example of vehicles adapting their driving by moving into a different lane or changing speeds based on received driver state information according to an embodiment. In FIG. 4A, an AV 402 is semi-autonomous but has a human driver behind the wheel while all remaining AVs 404, 406, and 408 on the road are fully autonomous. The driver of the AV 402 is able to keep the car straight while maintaining steady speed on the road, however, due to the fatigue build up, the driver's concentration levels start to decrease. The driver assistance system issues an audible warning to the driver and suggests that the driver assistance system take over the driving. However, because the driver is just starting to feel the fatigue build up and has nearly reached the destination, the driver refuses to hand over the control and continues to drive. The AV 402 starts to broadcast the fatigue level of the driver to the nearby AVs 404, 406, and 408. Upon receiving this risky driver state, each AV 404, 406, and 406 takes a different course of action based on its current relative position. The AV 404 promptly moves to the left lane (as the AV 402 is determined to be too close to the AV 404) and reduces speed to let the AV 402 pass. The AV 406 is already ahead of the AV 402 and is in the right lane. Therefore, the AV 406 decides to stay on the same lane but increases its speed to create a safer distance with the AV 402. The AV 408 has been following the AV 402 at a close distance since the radar, LIDAR, and the cameras have not reported any potentially risks related to the AV 402 so far. However, upon receiving the DSRC message, the AV 408 becomes aware of the risky and the potential danger and moves into the right lane and slows down to increase its the distance with the AV 402. Once all the AVs 404, 406, and 408 complete their actions, the AV 402 is left alone in the middle lane due to the risk the driver poses to other vehicles on the road, as shown in FIG. 4B.

Figure 5:
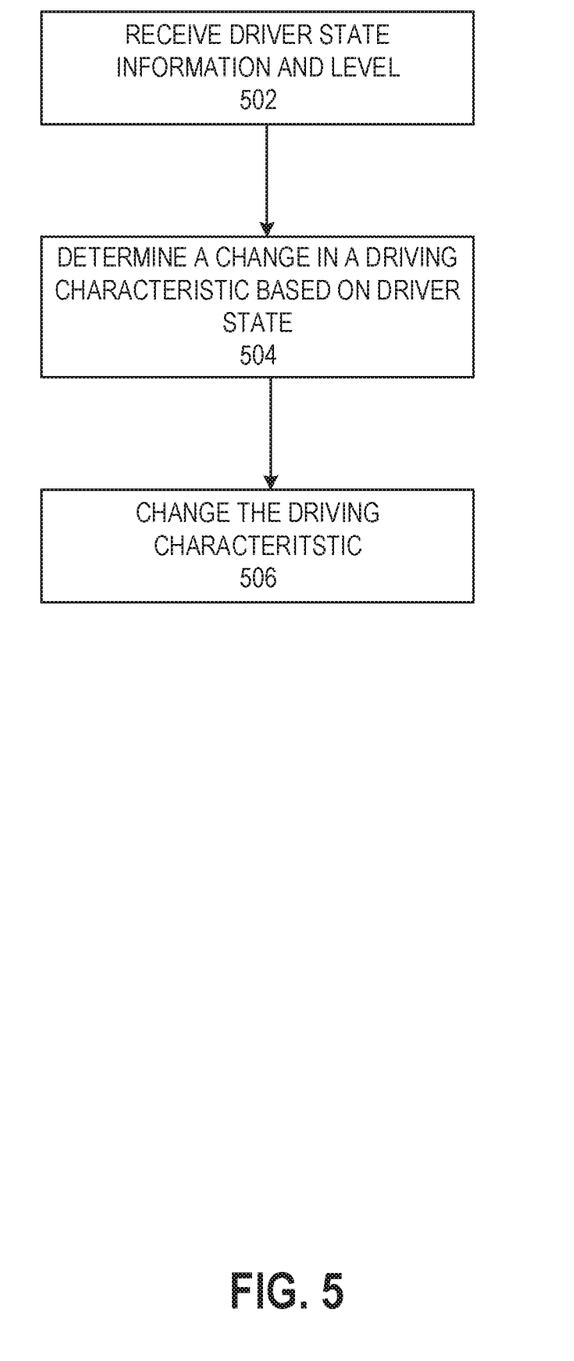
FIG. 5 is a flow diagram of a process for adapting driving of a vehicle based on received driver state information from a remote vehicle according to an embodiment.

FIG. 5 is a flow diagram of a process for adapting driving of a vehicle based on received driver state information from a remote vehicle according to an embodiment. At 502, driver state and level information is received from a remote vehicle. The driver state may be one or more of a drowsiness state, a stress state, a distraction state, or a fatigue state. The level may be a numerical value that indicates how deep into a particular state the driver is in. For example, the numerical value may be a value between 0 and 100, with 100 indicating the driver is deep in the particular state. The received information may be received via a dedicated short-range communication system from the remote vehicle. In an example, the driver state information and level are transmitted after the driver refuses to allow a driver system to take over driving the remote vehicle from the driver.

In the remote vehicle, the driver state and level may be determined from sensors within the remote vehicle. For example, a driver facing camera may determine if the driver is looking at the road or is being distracted. Other sensors that may be used include a seat pressure sensor, a steering wheel pressure sensor, or a steering wheel rotation sensor. If the driver is determined to be distracted, an audible warning may be played for the driver.

At 504, a change in a driving condition of the receiving AV is determined based on the driver state information and the level. In addition, data such as the receiving AV's current status, road conditions, or weather conditions may also be used to determine a change in state for the receiving AV. For example, a distracted driver in the remote vehicle may indicate that the receiving AV should change its state to avoid an accident. Another example, is the driver may be impaired and the remote vehicle may have multiple occupants. Based on this information, the receiving AV may determine to change its state to account for the impaired driver. A change in state may include increasing the distance between the receiving AV and the remote AV. In another example, the receiving AV may determine a minimum distance between itself and the remote AV. The road conditions or weather may also impact the minimum distance calculation. In another example, the change of state is to change lanes.

At 506, the change in the driving condition is made. For example, the receiving AV may determine to increase its distance with the remote AV by increasing its speed. This may occur when the receiving AV is in front of the remote AV. The receiving AV may also decrease its speed, allowing the remote AV to drive further ahead. The receiving AV may also determine that changing lanes would increase the distance between the receiving AV and the remote AV.

After the minimum distance between the receiving AV and remote AV has been achieved, the receiving AV may monitor the distance. In addition, the remote AV may continue to broadcast the driver state information and levels. If the driver state information and levels indicate that the driver is no longer distracted, the receiving AV may decrease the minimum distance value. If the distance between the receiving AV and the remote AV becomes less than the minimum distance, the receiving AV may make additional state changes such that the minimum distance is maintained.

Example Machine Description

Figure 6:
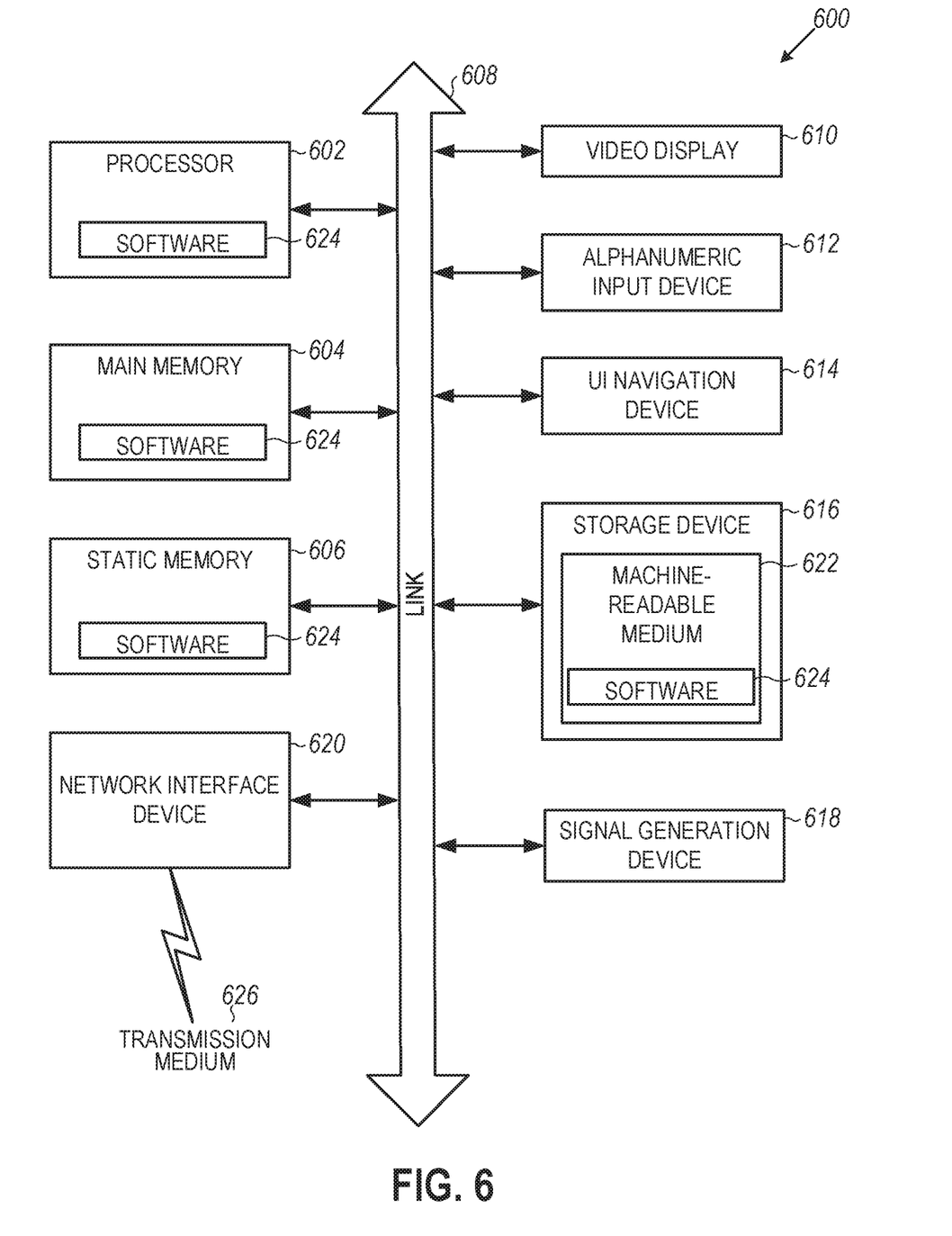
FIG. 6 illustrates a block diagram of computing device, within which a set or sequence of instructions may be executed to cause the device to perform examples of any one of the methodologies discussed herein.

FIG. 6 illustrates a block diagram of computing device 600, within which a set or sequence of instructions may be executed to cause the device to perform examples of any one of the methodologies discussed herein. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes And Examples

Example 1 is an apparatus for remote driver state consideration, the apparatus comprising: processing circuitry configured to: decode, from a message received from a remote vehicle, a remote driver state of a driver of the remote vehicle and a level of the remote driver state; determine a change in a state of a vehicle based on the remote driver state and the level of the remote driver state; and effectuate the change in the state of the vehicle.

In Example 2, the subject matter of Example 1 includes, wherein the remote driver state is one of a drowsiness state, a stress state, a distraction state, or a fatigue state.

In Example 3, the subject matter of Examples 1-2 includes, wherein the change in the state of the vehicle comprises an increase in distance between the vehicle and the remote vehicle.

In Example 4, the subject matter of Examples 1-3 includes, wherein the change in the state of the vehicle comprises a change in speed vehicle.

In Example 5, the subject matter of Examples 1-4 includes, wherein the change in the state of the vehicle comprises a change in a lane.

In Example 6, the subject matter of Examples 1-5 includes, wherein the processing circuitry is further configured to effectuate a warning based on the remote driver state and the level of the remote driver state.

In Example 7, the subject matter of Examples 1-6 includes, wherein the processing circuitry is further configured to: receive sensor data from a sensor; determine a driver state of a driver of the vehicle based on the sensor data; encode the driver state for transmission to the remote vehicle.

In Example 8, the subject matter of Example 7 includes, wherein the processing circuitry is further configured to determine a level of the driver state based on the sensor data.

In Example 9, the subject matter of Examples 7-8 includes, wherein the sensor is one of a driver facing camera, a seat pressure sensor, a steering wheel pressure sensor, or a steering wheel rotation sensor.

Example 10 is a machine-implemented method for considering a remote driver state, the method comprising: decoding, from a message received from a remote vehicle, a remote driver state of a driver of the remote vehicle and a level of the remote driver state; determining a change in a state of a vehicle based on the remote driver state and the level of the remote driver state; and effectuating the change in the state of the vehicle.

In Example 11, the subject matter of Example 10 includes, wherein the remote driver state is one of a drowsiness state, a stress state, a distraction state, or a fatigue state.

In Example 12, the subject matter of Examples 10-11 includes, wherein the change in the state of the vehicle comprises an increase in distance between the vehicle and the remote vehicle.

In Example 13, the subject matter of Examples 10-12 includes, wherein the change in the state of the vehicle comprises a change in speed vehicle.

In Example 14, the subject matter of Examples 10-13 includes, wherein the change in the state of the vehicle comprises a change in a lane.

In Example 15, the subject matter of Examples 10-14 includes, effectuating a warning based on the remote driver state and the level of the remote driver state.

In Example 16, the subject matter of Examples 10-15 includes, receiving sensor data from a sensor; determining a driver state of a driver of the vehicle based on the sensor data; encoding the driver state for transmission to the remote vehicle.

In Example 17, the subject matter of Example 16 includes, determining a level of the driver state based on the sensor data.

In Example 18, the subject matter of Examples 16-17 includes, wherein the sensor is one of a driver facing camera, a seat pressure sensor, a steering wheel pressure sensor, or a steering wheel rotation sensor.

Example 19 is at least one computer-readable medium for considering a remote driver state comprising instructions which when executed by a machine, cause the machine to perform operations: decoding, from a message received from a remote vehicle, a remote driver state of a driver of the remote vehicle and a level of the remote driver state; determining a change in a state of a vehicle based on the remote driver state and the level of the remote driver state; and effectuating the change in the state of the vehicle.

In Example 20, the subject matter of Example 19 includes, wherein the remote driver state is one of a drowsiness state, a stress state, a distraction state, or a fatigue state.

In Example 21, the subject matter of Examples 19-20 includes, wherein the change in the state of the vehicle comprises an increase in distance between the vehicle and the remote vehicle.

In Example 22, the subject matter of Examples 19-21 includes, wherein the change in the state of the vehicle comprises a change in speed vehicle.

In Example 23, the subject matter of Examples 19-22 includes, wherein the change in the state of the vehicle comprises a change in a lane.

In Example 24, the subject matter of Examples 19-23 includes, wherein the operations further comprise effectuating a warning based on the remote driver state and the level of the remote driver state.

In Example 25, the subject matter of Examples 19-24 includes, wherein the operations further comprise: receiving sensor data from a sensor; determining a driver state of a driver of the vehicle based on the sensor data; encoding the driver state for transmission to the remote vehicle.

In Example 26, the subject matter of Example 25 includes, determining a level of the driver state based on the sensor data.

In Example 27, the subject matter of Examples 25-26 includes, wherein the sensor is one of a driver facing camera, a seat pressure sensor, a steering wheel pressure sensor, or a steering wheel rotation sensor.

Example 28 is an apparatus for remote drive state consideration, the apparatus comprising: means for decoding, from a message received from a remote vehicle, a remote driver state of a driver of the remote vehicle and a level of the remote driver state; means for determining a change in a state of a vehicle based on the remote driver state and the level of the remote driver state; and means for effectuating the change in the state of the vehicle.

In Example 29, the subject matter of Example 28 includes, wherein the remote driver state is one of a drowsiness state, a stress state, a distraction state, or a fatigue state.

In Example 30, the subject matter of Examples 28-29 includes, wherein the change in the state of the vehicle comprises an increase in distance between the vehicle and the remote vehicle.

In Example 31, the subject matter of Examples 28-30 includes, wherein the change in the state of the vehicle comprises a change in speed vehicle.

In Example 32, the subject matter of Examples 28-31 includes, wherein the change in the state of the vehicle comprises a change in a lane.

In Example 33, the subject matter of Examples 28-32 includes, means for effectuating a warning based on the remote driver state and the level of the remote driver state.

In Example 34, the subject matter of Examples 28-33 includes, means for receiving sensor data from a sensor; means for determining a driver state of a driver of the vehicle based on the sensor data; means for encoding the driver state for transmission to the remote vehicle.

In Example 35, the subject matter of Example 34 includes, determining a level of the driver state based on the sensor data.

In Example 36, the subject matter of Examples 34-35 includes, wherein the sensor is one of a driver facing camera, a seat pressure sensor, a steering wheel pressure sensor, or a steering wheel rotation sensor.

Example 37 is at least one machine-readable medium including instructions, which when executed by a machine, cause the machine to perform operations of any of the operations of Examples 10-18.

Example 38 is an apparatus comprising means for performing any of the operations of Examples 10-18.

Example 39 is at least one machine-readable medium including instructions that, when executed by processing circuitry, cause the processing circuitry to perform operations to implement of any of Examples 1-38.

Example 40 is an apparatus comprising means to implement of any of Examples 1-38.

Example 41 is a system to implement of any of Examples 1-38.

Example 42 is a method to implement of any of Examples 1-38.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In an embodiment, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In an embodiment, a receiver as described herein may be configured to receive signals in accordance with specific communication standards, such as the Institute of Electrical and Electronics Engineers (IEEE) standards including IEEE 802.11 standards or proposed specifications for WLANs, although the scope of the disclosure is not limited in this respect as they may also be suitable to transmit or receive communications in accordance with other techniques and standards. In an embodiment, the receiver may be configured to receive signals in accordance with the IEEE 802.16-2004, the IEEE 802.16(e) or IEEE 802.16(m) standards for wireless metropolitan area networks (WMANs) including variations and evolutions thereof, although the scope of the disclosure is not limited in this respect as they may also be suitable to transmit or receive communications in accordance with other techniques and standards. In an embodiment, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for remote driver state consideration, the apparatus comprising:
    processing circuitry configured to:
        decode, from a message received from a remote vehicle, a remote driver state of a driver of the remote vehicle and a level of the remote driver state, wherein the message includes a plurality of target states and their corresponding levels, the plurality of target states selected from: a drowsiness level, a stress level, a distraction level, a fatigue level, and an alertness level, and wherein the alertness level is calculated from a combination of other target states in the plurality of target states;
        determine a change in a driving characteristic of a vehicle based on the remote driver state and the level of the remote driver state; and
        change the driving characteristic of the vehicle.

2. The apparatus of claim 1, wherein the remote driver state is one of a drowsiness state, a stress state, a distraction state, or a fatigue state.

3. The apparatus of claim 1, wherein the change in the driving characteristic of the vehicle comprises an increase in distance between the vehicle and the remote vehicle.

4. The apparatus of claim 1, wherein the change in the driving characteristic of the vehicle comprises a change in speed vehicle.

5. The apparatus of claim 1, wherein the change in the driving characteristic of the vehicle comprises a change in a lane.

6. The apparatus of claim 1, wherein the processing circuitry is further configured to effectuate a warning based on the remote driver state and the level of the remote driver state.

7. The apparatus of claim 1, wherein the processing circuitry is further configured to:
receive sensor data from a sensor;
determine a driver state of a driver of the vehicle based on the sensor data; and
encode the driver state for transmission to the remote vehicle.

8. The apparatus of claim 7, wherein the processing circuitry is further configured to determine a level of the driver state based on the sensor data.

9. The apparatus of claim 7, wherein the sensor is one of a driver facing camera, a seat pressure sensor, a steering wheel pressure sensor, or a steering wheel rotation sensor.

10. A machine-implemented method for considering a remote driver state, the method comprising:
decoding, from a message received from a remote vehicle, a remote driver state of a driver of the remote vehicle and a level of the remote driver state, wherein the message includes a plurality of target states and their corresponding levels, the plurality of target states selected from: a drowsiness level, a stress level, a distraction level, a fatigue level, and an alertness level, and wherein the alertness level is calculated from a combination of other target states in the plurality of target states;
determining a change in a driving characteristic of a vehicle based on the remote driver state and the level of the remote driver state; and
changing the driving characteristic of the vehicle.

11. The method of claim 10, wherein the remote driver state is one of a drowsiness state, a stress state, a distraction state, or a fatigue state.

12. The method of claim 10, wherein the change in the driving characteristic of the vehicle comprises an increase in distance between the vehicle and the remote vehicle.

13. The method of claim 10, wherein the change in the driving characteristic of the vehicle comprises a change in speed vehicle.

14. The method of claim 10, wherein the change in the driving characteristic of the vehicle comprises a change in a lane.

15. The method of claim 10, further comprising effectuating a warning based on the remote driver state and the level of the remote driver state.

16. The method of claim 10, further comprising:
receiving sensor data from a sensor;
determining a driver state of a driver of the vehicle based on the sensor data; and
encoding the driver state for transmission to the remote vehicle.

17. The method of claim 16, further comprising determining a level of the driver state based on the sensor data.

18. The method of claim 16, wherein the sensor is one of a driver facing camera, a seat pressure sensor, a steering wheel pressure sensor, or a steering wheel rotation sensor.

19. At least one non-transitory computer-readable medium including instructions for considering a remote driver state, the computer-readable medium comprising instructions that, when executed by a machine, cause the machine to perform operations comprising:
decoding, from a message received from a remote vehicle, a remote driver state of a driver of the remote vehicle and a level of the remote driver state, wherein the message includes a plurality of target states and their corresponding levels, the plurality of target states selected from: a drowsiness level, a stress level, a distraction level, a fatigue level, and an alertness level, and wherein the alertness level is calculated from a combination of other target states in the plurality of target states;
determining a change in a driving characteristic of a vehicle based on the remote driver state and the level of the remote driver state; and
changing the driving characteristic of the vehicle.

20. The at least one non-transitory computer-readable medium of claim 19, wherein the remote driver state is one of a drowsiness state, a stress state, a distraction state, or a fatigue state.

21. The at least one non-transitory computer-readable medium of claim 19, wherein the change in the driving characteristic of the vehicle comprises an increase in distance between the vehicle and the remote vehicle.

22. The at least one non-transitory computer-readable medium of claim 19, wherein the change in the driving characteristic of the vehicle comprises a change in speed vehicle.

23. The at least one non-transitory computer-readable medium of claim 19, wherein the change in the driving characteristic of the vehicle comprises a change in a lane.

24. The at least one non-transitory computer-readable medium of claim 19, wherein the operations further comprise effectuating a warning based on the remote driver state and the level of the remote driver state.

25. The at least one non-transitory computer-readable medium of claim 19, wherein the operations further comprise:
receiving sensor data from a sensor;
determining a driver state of a driver of the vehicle based on the sensor data; and
encoding the driver state for transmission to the remote vehicle.

* * * * *